(12) United States Patent
Kiyota et al.

(10) Patent No.: US 11,538,609 B2
(45) Date of Patent: Dec. 27, 2022

(54) GROMMET AND WIRE HARNESS

(71) Applicant: Yazaki Corporation, Tokyo (JP)

(72) Inventors: Hirotaka Kiyota, Shizuoka (JP); Masaru Kiuchi, Shizuoka (JP); Takeshi Onoda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 158 days.

(21) Appl. No.: 17/172,008

(22) Filed: Feb. 9, 2021

(65) Prior Publication Data
US 2021/0257134 A1 Aug. 19, 2021

(30) Foreign Application Priority Data

Feb. 17, 2020 (JP) .............................. JP2020-024488

(51) Int. Cl.
*F16L 5/00* (2006.01)
*H01B 17/58* (2006.01)

(52) U.S. Cl.
CPC .............. *H01B 17/586* (2013.01); *F16L 5/00* (2013.01)

(58) Field of Classification Search
None
See application file for complete search history.

(56) References Cited

U.S. PATENT DOCUMENTS

| | | | |
|---|---|---|---|
| 2015/0129303 A1 | 5/2015 | Shitamichi et al. | |
| 2019/0351849 A1 | 11/2019 | Suenaga et al. | |
| 2020/0079303 A1* | 3/2020 | Yoshimura | B60R 16/0222 |
| 2020/0079304 A1* | 3/2020 | Yoshimura | B60R 16/0222 |
| 2020/0080583 A1* | 3/2020 | Yoshimura | B62D 27/02 |
| 2020/0353881 A1* | 11/2020 | Toyoda | B60R 16/0222 |
| 2021/0101543 A1* | 4/2021 | Toyoda | B60R 16/0222 |
| 2021/0129773 A1* | 5/2021 | Ando | B60R 16/0222 |
| 2021/0129774 A1* | 5/2021 | Ando | B60R 16/0222 |
| 2021/0129775 A1* | 5/2021 | Ando | B60R 16/0222 |
| 2021/0138980 A1* | 5/2021 | Cho | B60R 16/0222 |
| 2021/0241944 A1* | 8/2021 | Yamaguchi | H01B 17/583 |
| 2021/0257131 A1* | 8/2021 | Kiyota | H01B 17/583 |
| 2021/0257132 A1* | 8/2021 | Kiyota | H01B 7/0045 |
| 2022/0032864 A1* | 2/2022 | Kiyota | H02G 3/0406 |

FOREIGN PATENT DOCUMENTS

| | | |
|---|---|---|
| JP | S54-157342 U | 11/1979 |
| JP | 2005-190973 A | 7/2005 |

* cited by examiner

*Primary Examiner* — Steven M Marsh
(74) *Attorney, Agent, or Firm* — Kenealy Vaidya LLP

(57) ABSTRACT

A grommet includes a fitting body causing a fitting groove to be fitted to a circumferential edge of a through hole, and a first tubular body and a second tubular body. The fitting body includes a tubular portion, a rib rising from an outer circumferential wall surface of the tubular portion, and a locked portion disposed radially inside the rib, rising from the outer circumferential wall surface, and configured to be locked to an outer circumferential surface of the first tubular body, to suppress elastic deformation of the tubular portion or reduce elastic deformation amount. The rib is elastically deformable in a circumferential direction, and the outer circumferential wall surface has a plurality of projection groups constituted by the locked portion and a plurality of ribs disposed radially outside the locked portion.

5 Claims, 5 Drawing Sheets

GROMMET AND WIRE HARNESS

CROSS-REFERENCE TO RELATED APPLICATION(S)

The present application claims priority to and incorporates by reference the entire contents of Japanese Patent Application No. 2020-024488 filed in Japan on Feb. 17, 2020.

BACKGROUND OF THE INVENTION

1. Field of the Invention

The present invention relates to a grommet and a wire harness.

2. Description of the Related Art

A wire harness is conventionally provided with an electric wire penetrating a circular through hole in a wall body (e.g. a vehicle body panel of a vehicle) to route the electric wire in both spaces partitioned by the wall body. The wall body is accordingly provided with a grommet closing a gap between the through hole and the electric wire for protection of the electric wire from a circumferential edge of the through hole as well as Prevention. of liquid entry to the gap. The grommet exemplarily includes a fitting body configured to fit the circumferential edge of the through hole into an annular fitting groove and route the electric wire in the fitting body along a hole axis of the through hole, a first cylinder having a cylindrical shape, projecting from a first axial end of the fitting body, and extracting the electric wire in the fitting body through the cylinder, and a second cylinder having a cylindrical shape, projecting from a second axial end or the fitting body, and extracting the electric wire in the fitting body through the cylinder. In the grommet, one of the cylinders is pulled along a cylinder axis, the fitting body caught by the circumferential edge of the through hole being deformed and sliding guides the circumferential edge to be fitted into the fitting groove. Such a grommet of this type is disclosed in Japanese Patent Application Laid-open No. 2005-190973 and the like. In order for decrease in insertion force for assembly of the fitting body to the through hole in the wall body, the grommet according to Japanese Patent Application Laid-open No. 2005-190973 provides a plurality of ribs rising at equal intervals on a surface of the fitting body along an entire circumference and thus achieves reduction in frictional resistance upon sliding. Each of the ribs is in contact with the circumferential edge of the through hole until guided into the fitting groove, for reduction in contact area between the circumferential edge of the through hole and the fitting body being sliding.

A wire harness needs to enable further reduction in force of inserting the fitting body to the through hole in the wall body, for improvement in assembling workability. Meanwhile, a grommet needs to keep an assembled state after being assembled to the through hole in the wall body.

SUMMARY OF THE INVENTION

In view of these, it is an object of the present invention to provide a grommet and a wire harness that can reduce insertion force as well as can keep an assembled state.

In order to achieve the above mentioned object, a grommet according to one aspect of the present invention includes a fitting body causing a circumferential edge of a through hole having a circular shape and provided in a wall body to be fitted into a fitting groove having an annular shape and provided in an outer wall, and causing a harness body routed along a hole axis of the through hole in a space inside the outer wall to be extracted from the space through a first extraction port having a circular shape and disposed at a first axial end and through a second extraction port having a circular shape and disposed at a second axial end; a first tubular body having a cylinder axis coaxial with an axis of the fitting body, projecting outward from a circumferential edge of the first extraction port, and causing the harness body in the space to be extracted through the tubular body; and a second tubular body having a cylinder axis coaxial with the axis of the fitting body, projecting outward from a circumferential edge of the second extraction port, and causing the harness body in the space to be extracted through the tubular body, wherein the fitting body includes a tubular portion having an outer circumferential wall surface continuously connected to the fitting groove at a position closer to the first tubular body than the fitting groove in the outer wall, and gradually reduced in diameter as being away coaxially from the fitting groove, at least one rib rising from the outer circumferential wall surface of the tubular portion and extending on the outer circumferential wall surface at least from a position equal in diameter to the circumferential edge of the through hole to a radially outer end, and a locked portion disposed radially inside the rib, rising from the outer circumferential wall surface, and configured to be locked to an outer circumferential surface of the first tubular body when the first tubular body is shifted relatively to the fitting body along the cylinder axis toward the second tubular body, to suppress elastic deformation of the tubular portion or reduce elastic deformation amount of the tubular pardon, and the rib is shaped to enable elastic deformation of the rib in the circumferential direction of the outer circumferential wall surface, and the outer circumferential wall surface has a plurality of projection groups disposed at equal intervals in the circumferential direction, each projection group being constituted by the locked portion and a plurality of the ribs disposed radially outside the locked portion.

According to another aspect of the present invention, in the grommet, it is preferable that the projection groups each include the locked portion and the rib extending radially outward from each of both ends in the circumferential direction at the radially outer end of the locked portion.

According to still another aspect of the present invention, in the grommet, it is preferable that elastic deformation in the circumferential direction of the rib indicates inclining deformation in the circumferential direction within an elastic region when an end surface on a rising side of the rib receives force along the cylinder axis, or deformation like shear deformation by displacement in the circumferential direction from the end surface side within the elastic region when the force along the cylinder axis is applied.

In order to achieve the above mentioned object, a wire harness according to still another aspect of the present invention includes a harness body; and a grommet protecting the harness body, wherein the grommet includes: a fitting body causing a circumferential edge of a through hole having a circular shape and provided in a wall body to be fitted into a fitting groove having an annular shape and provided in an outer wall, and causing the harness body routed along a hole axis of the through hole in a space inside the outer wall to be extracted from the space through a first extraction port having a circular shape and disposed at a first axial end and through a second extraction port having a circular shape and disposed at a second axial end; a first tubular body having a cylinder axis coaxial with an axis of the fitting body, projecting outward from a circumferential edge of the first extraction port, and causing the harness body in the space to be extracted through the tubular body; and a second tubular body having a cylinder axis coaxial with the axis of the fitting body, projecting outward from a circumferential edge of the second extraction port, and causing the harness body in the space to be extracted through the tubular body, the fitting body includes a tubular portion having an outer circumferential wall surface continuously connected to the fitting groove at a position closer to the first tubular body than the fitting groove in the outer wall, and gradually reduced in diameter as being away coaxially from the fitting groove, at least one rib rising from the outer circumferential wall surface of the tubular portion and extending on the outer circumferential wall surface at least from a position equal in diameter to the circumferential edge of the through hole to a radially outer end, and a locked portion disposed radially inside the rib, rising from the outer circumferential wall surface, and configured to be locked to an outer circumferential surface of the first tubular body when the first tubular body is shifted relatively to the fitting body along the cylinder axis toward the second tubular body, to suppress elastic deformation of the tubular portion or reduce elastic deformation amount of the tubular portion, the rib is shaped to enable elastic deformation of the rib in the circumferential direction of the outer circumferential wall surface, and the outer circumferential wall surface has a plurality of projection groups disposed at equal intervals in the circumferential direction, each projection group being constituted by the locked portion and a plurality of the ribs disposed radially outside the locked portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A grommet and a wire harness according to an embodiment of the present invention will hereinafter be described in detail with reference to the drawings. This invention is not to be limited by the embodiment.

Embodiment

A grommet and a wire harness according to an embodiment of the present invention will be described with reference to FIG. 1 to FIG. 5.

Figure 1:
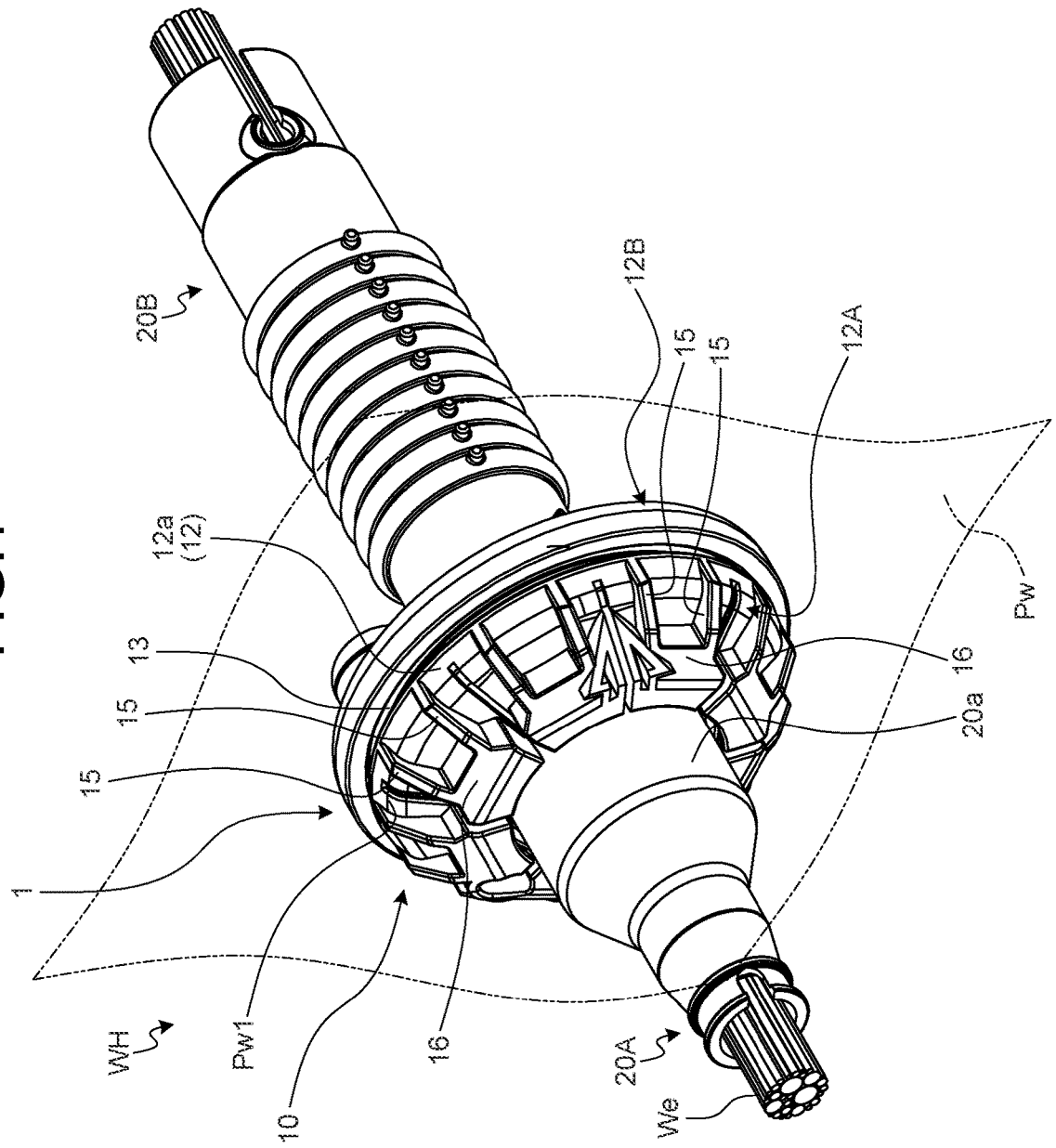
FIG. 1 is a perspective view of a grommet and a wire harness according to an embodiment.

FIG. 1 to FIG. 5 include reference sign 1 denoting a grommet according to the present embodiment. The grommet 1 protects a harness body We inserted through a circular through hole Pw1 provided in a wall body Pw. The harness body We includes a single or a plurality of bundled electric wires functioning as communication lines or power supply lines. When the harness body We includes the plurality of electric wires, the plurality of electric wires is collected together by an exterior component such as a corrugate tube or a resin tape. Examples of the wall body Pw for a vehicle includes a vehicle body panel. The harness body We is inserted through the through hole Pw1 in the wall body Pw so as to be routed in two spaces (e.g. an engine compartment and a cabin) partitioned by the wall body Pw. The harness body We is used for communication between devices in these spaces, power supply from a power source in a first one of the spaces to an electric device in a second one of the spaces, and the like. The grommet 1 is attached to the wall body Pw so as to protect the harness body We from a circumferential edge of the through hole Pw1 in the wall body Pw and prevent liquid (e.g. water) from entering a gap between the through hole Pw1 and the harness body We. Herein, the grommet 1 and the harness body We assembled together will be referred to as a wire harness WH (FIG. 1).

The grommet 1 is made of an elastic material such as an elastomer. The grommet 1 integrally includes a fitting body 10, a first tubular body 20A, and a second tubular body 20B to be described below. In the grommet 1, the fitting body 10 has one axial end connected coaxially to the first tubular body 20A, and the other axial end connected coaxially to the second tubular body 20B.

Figure 2:
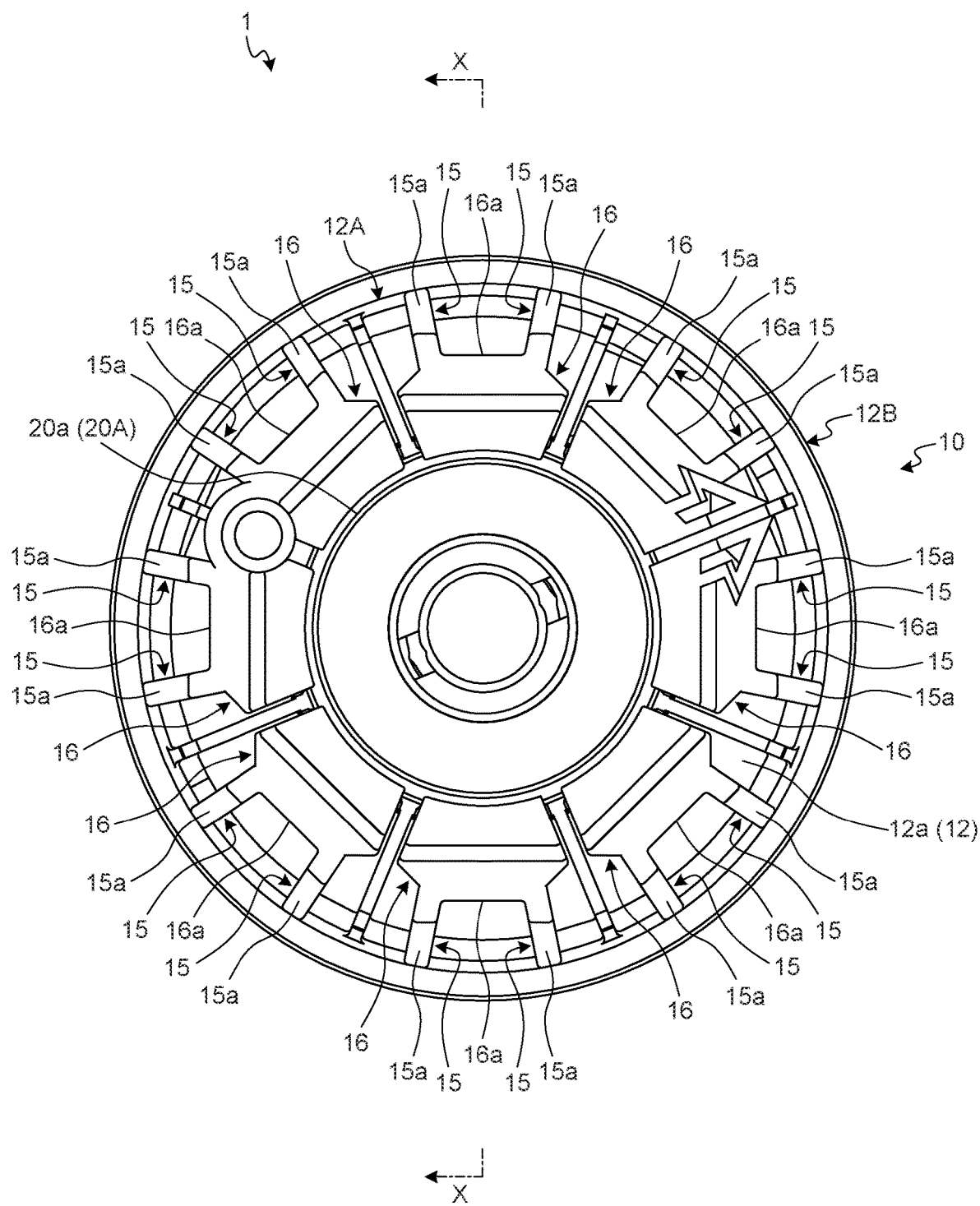
FIG. 2 is a plan view of the grommet viewed in an axial direction.
Figure 3:
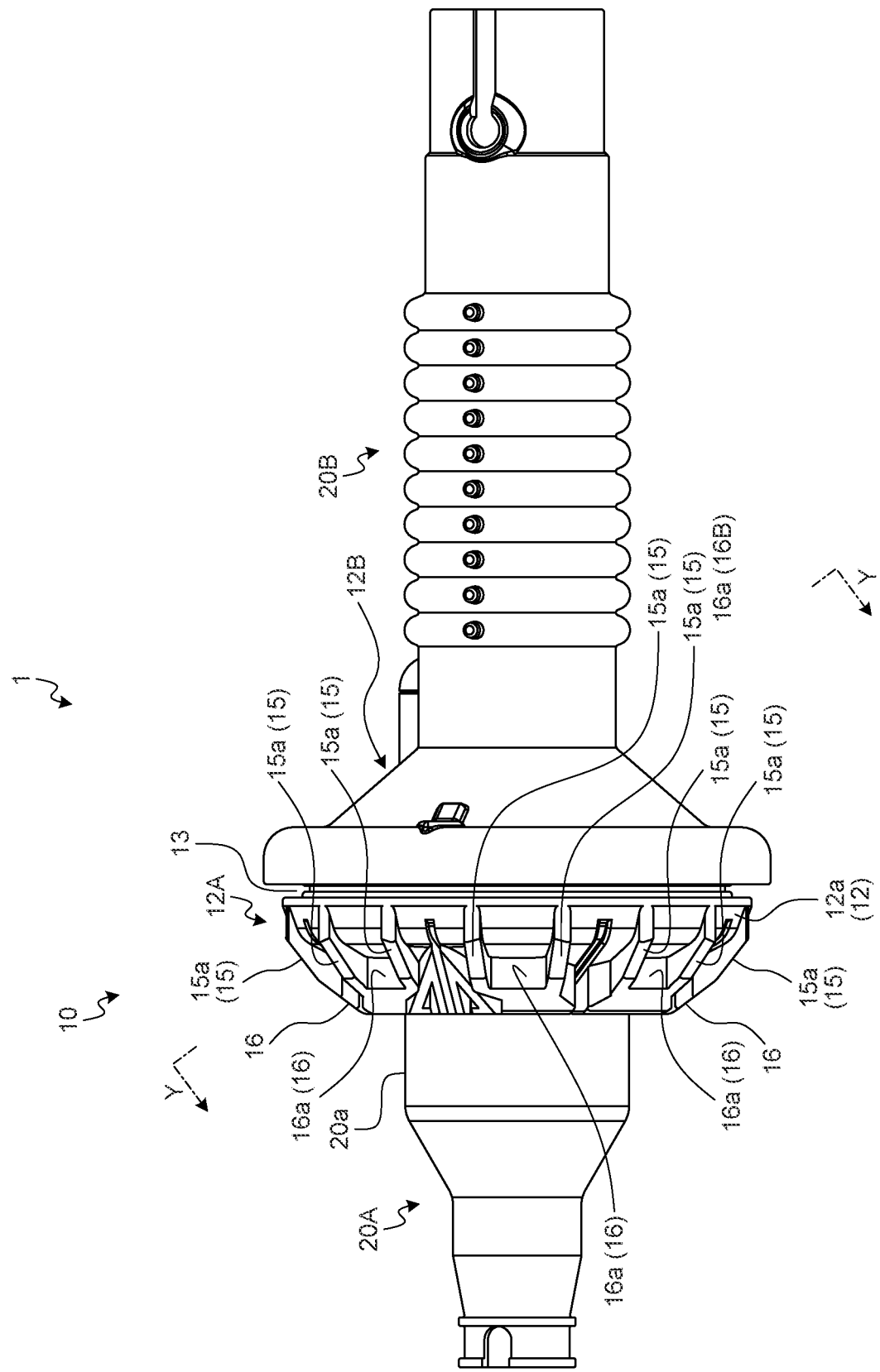
FIG. 3 is a plan view of the grommet viewed in a direction perpendicular to the axial direction.
Figure 4:
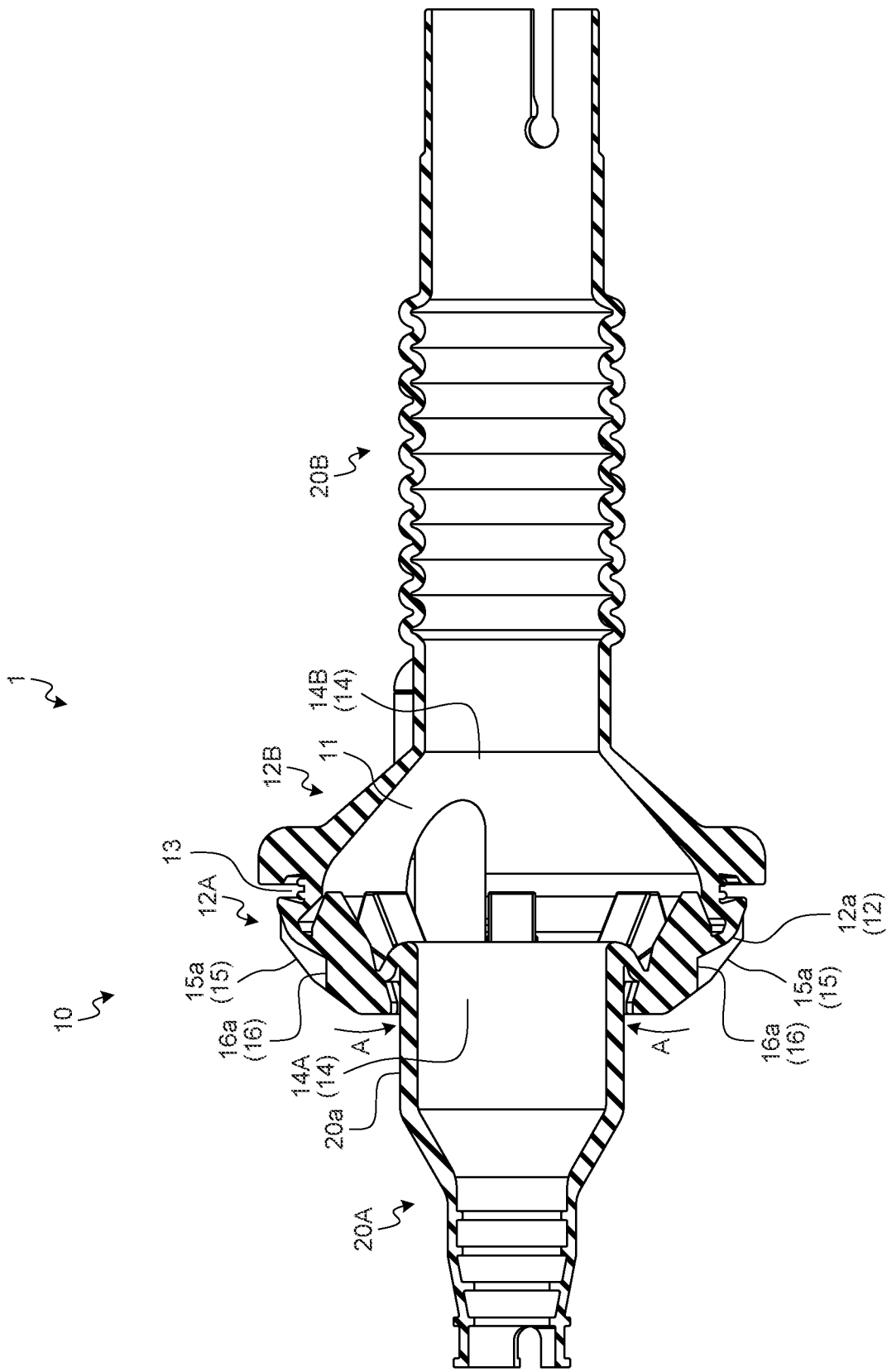
FIG. 4 is a sectional view taken along line X-X indicated in FIG. 2.
Figure 5:
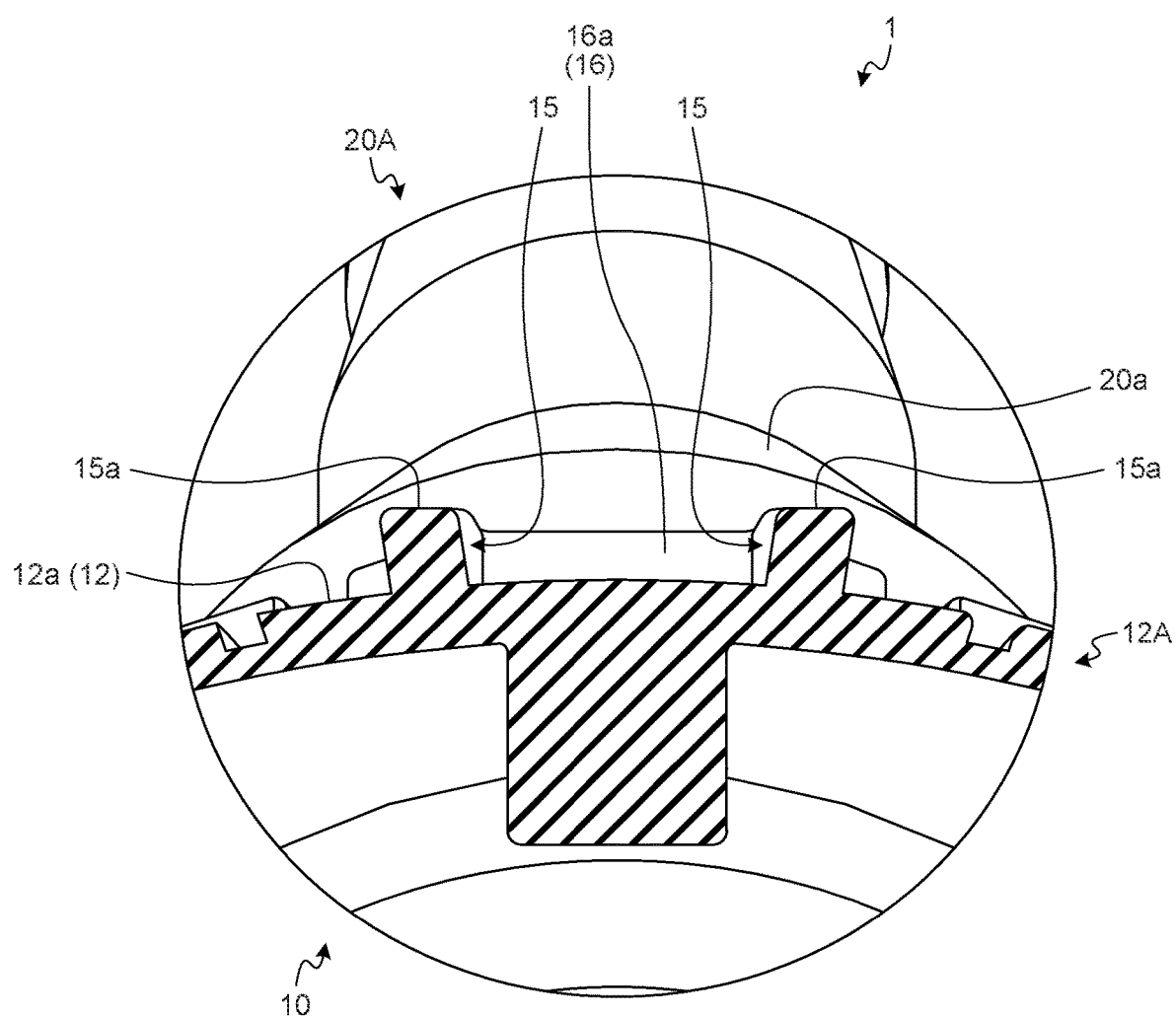
FIG. 5 is a partial enlarged sectional view taken along line Y-Y indicated in FIG. 3.

The grommet 1 includes the fitting body 10 fitted to the circumferential edge of the through hole Pw1 (FIG. 1 to FIG. 4). The fitting body 10 is constituted by an outer wall 12 having an interior serving as a space 11 (FIG. 4). The outer wall 12 has a gradually changing tubular portion (hereinafter, referred to as a "first tubular portion") 12A having a gradually reducing diameter along a cylinder axis toward the first tubular body 20A, and a gradually changing tubular portion (hereinafter, referred to as a "second tubular portion") 120 having a gradually reducing diameter along a cylinder axis toward the second tubular body 200. The outer wall 12 exemplified herein is shaped to include the first tubular portion. 12A having a truncated cone shape and the second tubular portion 120 having a truncated cone shape combined coaxially with each other. In this outer wall 12, the first tubular portion 12A and the second tubular portion 120 have bottoms equal in diameter and coupled coaxially to each other, and tops disposed at respective axial ends. In the grommet 1, the first tubular body 20A is coupled to the top side of the first tubular portion. 12A, and the second tubular body 20B is coupled to the top side of the second tubular portion 12G.

The outer wall 12 has an outer circumferential wall surface 12a provided coaxially with an annular fitting groove 13 receiving the circumferential edge of the through hole Pw1 in the wall body Pw (FIG. 1, FIG. 3, and FIG. 4). The fitting groove 13 is provided at a coupled portion on the bottom side of the first tubular portion 12A and the second tubular portion 120, or adjacent to the bottom of one of the first tubular portion 12A and the second tubular portion 120. The fitting body 10 exemplified herein has the fitting groove 13 provided at the coupled portion on the bottom side of the first tubular portion 12A and the second tubular portion 12B. The first tubular portion 12A has the outer circumferential wall surface 12a continuously connected to the fitting groove 13 at a position closer to the first tubular body 20A than the fitting groove 13 in the outer wall 12, and has a gradually changing tubular shape with the gradually reduced diameter as being away coaxially from the fitting groove 13. The second tubular portion 12O has the outer circumferential wall surface 12a continuously connected to the fitting groove 13 at a position closer to the second tubular body 20B than the fitting groove 13 in the outer wall 12, and has a gradually changing tubular shape with the gradually reduced diameter as being away coaxially from the fitting groove 13.

The space 11 inside the outer wall 12 accommodates the harness body We routed along a hole axis of the through hole Pw1. The fitting body 10 causes the harness body We to be extracted from the space 11 through a first extraction port 14A. (FIG. 4) at the first axial end and a second extraction port 14B (FIG. 4) at the second axial end. The tops of the first tubular portion 12A and the second tubular portion 12B are opened in the outer wall 12. In the outer wall 12, the first extraction port 14A is constituted by a circular opening provided in the top of the first tubular portion 12A, and the second extraction port 14B is constituted by a circular opening provided in the top of the second tubular portion 12B.

Furthermore, the grommet 1 includes the first tubular body 20A having the cylinder axis coaxial with an axis of the fitting body 10, projecting outward from a circumferential edge of the first extraction port 14A, and causing the harness body We in the space 11 to be extracted through the tubular body, and the second tubular body 20B having the cylinder axis coaxially with the axis of the fitting body 10, projecting outward from a circumferential edge of the second extraction port 14B, and causing the harness body We in the space 11 to be extracted through the tubular body (FIG. 1, FIG. 3, and FIG. 4). The first tubular body 20A has a cantilever shape with a fixed end adjacent to the first extraction port 14A and a free end which is an end in a projecting direction along the cylinder axis. The second tubular body 20B has a cantilever shape with a fixed end adjacent to the second extraction port 14B and a free end which is an end in a projecting direction along the cylinder axis.

The grommet 1 assembled to the harness body We is inserted, from the free end of the first tubular body 20A, into the through hole Pw in the wall body Pw. In the grommet 1, the first tubular body 20A is pulled along the cylinder axis to elastically deform the fitting body 10 caught by the circumferential edge of the through hole Pw1 in the wall body Pw as well as guide the circumferential edge to fit the circumferential edge into the fitting groove 13. The grommet 1 thus has frictional resistance due to sliding generated between the fitting body 10 and the circumferential edge of the through hole Pw1 in the wall body Pw. As the frictional resistance is larger, the fitting body 10 needs to be assembled to the through hole Pw1 in the wall body Pw with larger insertion force (force of pulling the first tubular body 20A).

In view of this, the grommet 1 according to the present embodiment includes ribs 15 provided at the fitting body 10 for reduction in frictional resistance (FIG. 1 to FIG. 5).

The ribs 15 rise from the outer circumferential wall surface 12a of the first tubular portion 12A, and each extend at least from a position equal in diameter to the circumferential edge of the through hole Pw1 in the wall body Pw in the outer circumferential wall surface 12a to a radially outer end. The ribs 15 have a plural number and are aligned in the circumferential direction of the outer circumferential wall surface 12a of the first tubular portion 12A. The ribs 15 each include an end surface 15a on a rising side (FIG. 2 to FIG. 5) that comes into contact with the circumferential edge of the through hole Pw1 in the wall body Pw when the first tubular body 20A inserted to the through hole Pw1 in the wall body Pw is pulled along the cylinder axis. When the fitting body 10 in the grommet 1 is assembled to the through hole Pw1 in the wall body Pw, the plurality of ribs 15 comes into contact with the circumferential edge of the through hole Pw1 in the wall body Pw as well as slides, to achieve reduction in contact area with the circumferential edge for smaller frictional resistance and reduced insertion force to the through hole Pw1 in the wall body Pw, in comparison to a case where the outer circumferential wall surface 12a of the first tubular portion 12A comes into contact with the circumferential edge of the through hole Pw1 in the wall body Pw as well as slides.

The ribs 15 are shaped to be elastically deformable in the circumferential direction (along each of the ribs 15 being arrayed). Such elastic deformation in the circumferential direction indicates circumferential deformation within an elastic region of each of the ribs 15 when the end surface 15a on the rising side receives force along the cylinder axis. Each of the ribs 15 is formed to have circumferential width (in other words, small width) enabling elastic deformation of the rib 15 in the circumferential direction with force applied along the cylinder axis to the end surface 15a. In the grommet 1, the plurality of ribs 15 having such small width enables reduction in contact area with the circumferential edge of the through hole Pw1 in the wall body Pw, reduction in frictional resistance, and reduction in insertion force to the through hole Pw1 in the wall body Pw.

Specifically, such elastic deformation in the circumferential direction of each of the ribs 15 indicates inclining deformation in the circumferential direction within the elastic region when the end surface 15a on the rising side receives force along the cylinder axis, or deformation like shear deformation by circumferential displacement of the rib 15 from the end surface 15a side within the elastic region when the force along the cylinder axis is applied. The rib 15 is exemplarily shaped to satisfy "½≤W/H≤1" as a relation between rising height H from the outer circumferential wall surface 12a and circumferential width W. The rib 15 is alternatively shaped such that the rising height H from the outer circumferential wall surface 12a is equal to or more than 1 mm.

The rib 15 exemplified herein is shaped to enable inclining deformation in the circumferential direction within the elastic region. In other words, the ribs 15 are each formed to have small circumferential width so as to enable inclining deformation in the circumferential direction (e.g. bending at a root adjacent to the outer circumferential wall surface 12a, or bending at a position between the root and the end surface 15a) within the elastic region by force along the cylinder axis applied to the end surface 15a on the rising side. Each of the ribs 15 small in width may be compressed within the elastic region by the circumferential edge or may be pressed by the circumferential edge to have inclining deformation in the circumferential direction within the elastic region when the end surface 15a on the rising side receives force along the cylinder axis from the circumferential edge of the through hole Pw1 in the wall body Pw.

The fitting body 10 in the grommet 1 further includes locked portions 16 that are disposed radially inside relative to the ribs 15, rise from the outer circumferential wall surface 12a, and are configured to be locked to an outer circumferential surface 20a of the first tubular body 20A when the first tubular body 20A as shifted relatively to the fitting body 10 along the cylinder axis toward the second tubular body 20B, for suppression of elastic deformation of the first tubular portion 12A or reduction in elastic deformation amount of the tubular portion 12A (FIG. 1 to FIG. 5). The locked portions 16 have a plural number and are aligned in the circumferential direction of the outer circumferential wall surface 12a of the first tubular portion 12A. Each of the locked portions 16 rotates along arrow A indicated in FIG. 4 to be locked to the outer circumferential surface 20a of the first tubular body 20A when the first tubular body 20A is shifted relatively to the fitting body 10 along the cylinder axis toward the second tubular body 20B. The locked portions 16 exemplified herein each have a cubic shape projecting from the outer circumferential wall surface 12a.

The plurality of locked portions 16 in the grommet 1 can suppress bending deformation or reduce bending deformation amount within the elastic region at the radially inner portion of the first tubular portion 12A, for rigidity improvement at the radially inner portion.

Meanwhile, the grommet 1 includes the plurality of ribs 15 provided at the radially outer portion of the first tubular portion 12A. The ribs 15 are, however, formed to have the small width enabling elastic deformation thereof in the circumferential direction by force applied along the cylinder axis to the end surface 15a on the rising side as described above. The first tubular portion 12A thus has bending deformation even positions with which the ribs 15 small in width are provided. Accordingly, the ribs 15 small in width do not make much contribution to rigidity improvement at the first tubular portion 12A. In other words, the ribs 15 do not effectively suppress elastic deformation at the radially outer portion in the fitting body 10 having been assembled to the through hole Pw1 in the wall body Pw.

In view of this, in the grommet 1 according to the present embodiment, the plurality of ribs 15 are disposed radially outside relative to one of the locked portions 16 in the first tubular portion 12A (FIG. 1 to FIG. 3, and FIG. 5). The first tubular portion 12A accordingly can suppress bending deformation or reduce bending deformation amount within the elastic region in the radially outer portion relative to the one of the locked portions 16, for rigidity improvement. The outer circumferential wall surface 12a of the first tubular portion 12A is provided with a plurality of projection groups disposed at equal intervals in the circumferential direction, each projection group being constituted by one of the locked portions 16 and a plurality of ribs 15 disposed radially outside relative to the one locked portion 16 (FIG. 2). In the first tubular portion 12A, the plurality of locked portions 16 disposed at equal intervals in the circumferential direction can improve rigidity at the radially inner portion, and the plurality of ribs 15 provided for each of the locked portions 16 can improve rigidity at the radially outer portion.

The plurality of projection groups in the fitting body 10 having been assembled to the through hole Pw1 in the wall body Pw achieves suppressed elastic deformation or reduction in elastic deformation amount at the radially outer portion and the radially inner portion of the first tubular portion 12A. In the grommet 1, the fitting groove 13 is provided at the radially outer portion of the fitting body 10. Due to effective suppression of elastic deformation at the radially outer portion of the first tubular portion 12A or the like as well as effective suppression of elastic deformation at the radially inner portion of the first tubular portion 12A, the circumferential edge of the through hole Pw1 in the wall body Ow can be kept fitted in the fitting groove 13 and the fitting body 10 can keep an assembled state to the through hole Pw1.

The projection groups each include the locked portion 16 and the rib 15 extending radially outward from each of both circumferential ends of a radially outer end 16a of the locked portion. 16 (FIG. 2 to FIG. 5). The projection groups exemplified herein are each provided as the two ribs 15 and the locked portion 16 integrated together.

As described above, in the grommet 1 and the wire harness PH according to the present embodiment, the plurality of ribs 15 small in width and elastically deformable in the circumferential direction come into contact with the circumferential edge of the through hole Ow1 in the wall body Ow as well as slides, to achieve reduction in contact area between each of the ribs 15 and the circumferential edge of the through hole Pw1 in the wall body Pw. The grommet 1 and the wire harness PH thus have reduced frictional resistance between each of the ribs 15 and the circumferential edge of the through hole Pw1 in the wall body Pw when the fitting body 10 is assembled to the through hole Pw1 in the wall body Ow, for reduction in insertion force to the through hole Pw1 in the wall body Pw. In the grommet 1 and the wire harness PH according to the present embodiment, the plurality of locked portions 16 disposed at equal intervals in the circumferential direction can improve rigidity at the radially inner portion of the first tubular portion 12A, and the plurality of ribs 15 provided for each of the locked portions 16 can improve rigidity at the radially outer portion of the first tubular portion 12A. In the Grommet 1 and the wire harness WH, the circumferential edge of the through hole Pw1 in the wall body Ow can thus be kept fitted in the fitting groove 13 and the fitting body 10 can keep the assembled state to the through hole Pw1. As described above, the grommet 1 and the wire harness WH according to the present embodiment can reduce insertion force to the through hole Pw1 in the wall body Ow as well as can keep the assembled state to the through hole Pw1.

In the grommet and the wire harness according to the embodiment, the plurality of ribs having small width and elastically deformable in the circumferential direction comes into contact with the circumferential edge of the through hole in the wall body as well as slides, to achieve reduction in contact area between each of the ribs and the circumferential edge, of the through hole in the wall body. The grommet and the wire harness thus have reduced frictional resistance between each of the ribs and the circumferential edge, of the through hole in the wall body when the fitting body is assembled to the through hole in the wall body, for reduction in insertion force to the through hole in the wall body. In the grommet and the wire harness according to the embodiment, the plurality of locked portions disposed at equal intervals in the circumferential direction can improve rigidity at a radially inner portion of the tubular portion, and the plurality of ribs provided for each of the locked portions can improve rigidity at a radially outer portion of the tubular portion. In the grommet and the wire harness, the circumferential edge of the through hole in the wall body can thus be kept fitted in the fitting groove and the fitting body can keep the assembled state to the through hole. As described above, the grommet and the wire harness according to the embodiment can reduce insertion force to the through hole in the wall body as well as can keep the assembled state to the through hole.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet comprising:
a fitting body causing a circumferential edge of a through hole having a circular shape and provided in a wall body to be fitted into a fitting groove having an annular shape and provided in an outer wall, and causing a harness body routed along a hole axis of the through hole in a space inside the outer wall to be extracted from the space through a first extraction port having a circular shape and disposed at a first axial end and through a second extraction port having a circular shape and disposed at a second axial end;
a first tubular body having a cylinder axis coaxial with an axis of the fitting body, projecting outward from a circumferential edge of the first extraction port, and causing the harness body in the space to be extracted through the tubular body; and
a second tubular body having a cylinder axis coaxial with the axis of the fitting body, projecting outward from a circumferential edge of the second extraction port, and causing the harness body in the space to be extracted through the tubular body, wherein
the fitting body includes a tubular portion having an outer circumferential wall surface continuously connected to the fitting groove at a position closer to the first tubular body than the fitting groove in the outer wall, and gradually reduced in diameter as being away coaxially from the fitting groove, at least one rib rising from the outer circumferential wall surface of the tubular portion and extending on the outer circumferential wall surface at least from a position equal in diameter to the circumferential edge of the through hole to a radially outer end, and a locked portion disposed radially inside the rib, rising from the outer circumferential wall surface, and configured to be locked to an outer circumferential surface of the first tubular body when the first tubular body is shifted relatively to the fitting body along the cylinder axis toward the second tubular body, to suppress elastic deformation of the tubular portion or reduce elastic deformation amount of the tubular portion, and
the rib is shaped to enable elastic deformation of the rib in a circumferential direction of the outer circumferential wall surface, and
the outer circumferential wall surface has a plurality of projection groups disposed at equal intervals in the circumferential direction, each projection group being constituted by the locked portion and a plurality of the ribs disposed radially outside the locked portion.

2. The grommet according to claim 1, wherein
the projection groups each include the locked portion and the rib extending radially outward from each of both ends in the circumferential direction at the radially outer end of the locked portion.

3. The grommet according to claim 1, wherein
elastic deformation in the circumferential direction of the rib indicates inclining deformation in the circumferential direction within an elastic region when an end surface on a rising side of the rib receives force along the cylinder axis, or deformation like shear deformation by displacement in the circumferential direction from the end surface side within the elastic region when the force along the cylinder axis is applied.

4. The grommet according to claim 2, wherein
elastic deformation in the circumferential direction of the rib indicates inclining deformation in the circumferential direction within an elastic region when an end surface on a rising side of the rib receives force along the cylinder axis, or deformation like shear deformation by displacement in the circumferential direction from the end surface side within the elastic region when the force along the cylinder axis is applied.

5. A wire harness comprising:
a harness body; and
a grommet protecting the harness body, wherein
the grommet includes:
a fitting body causing a circumferential edge of a through hole having a circular shape and provided in a wall body to be fitted into a fitting groove having an annular shape and provided in an outer wall, and causing the harness body routed along a hole axis of the through hole in a space inside the outer wall to be extracted from the space through a first extraction port having a circular shape and disposed at a first axial end and through a second extraction port having a circular shape and disposed at a second axial end;
a first tubular body having a cylinder axis coaxial with an axis of the fitting body, projecting outward from a circumferential edge of the first extraction port, and causing the harness body in the space to be extracted through the tubular body; and
a second tubular body having a cylinder axis coaxial with the axis of the fitting body, projecting outward from a circumferential edge of the second extraction port, and causing the harness body in the space to be extracted through the tubular body,
the fitting body includes a tubular portion having an outer circumferential wall surface continuously connected to the fitting groove at a position closer to the first tubular body than the fitting groove in the outer wall, and gradually reduced in diameter as being away coaxially from the fitting groove, at least one rib rising from the outer circumferential wall surface of the tubular portion and extending on the outer circumferential wall surface at least from a position equal in diameter to the circumferential edge of the through hole to a radially outer end, and a locked portion disposed radially inside the rib, rising from the outer circumferential wall surface, and configured to be locked to an outer circumferential surface of the first tubular body when the first tubular body is shifted relatively to the fitting body along the cylinder axis toward the second tubular body, to suppress elastic deformation of the tubular portion or reduce elastic deformation amount of the tubular portion,
the rib is shaped to enable elastic deformation of the rib in a circumferential direction of the outer circumferential wall surface, and
the outer circumferential wall surface has a plurality of projection groups disposed at equal intervals in the circumferential direction, each projection group being constituted by the locked portion and a plurality of the ribs disposed radially outside the locked portion.

* * * * *